3,759,737
DEPOSITION OF HIGH REFRACTIVE INDEX COATINGS ON FRESHLY WET GROUND MICA
Paul W. Wetzold, Yorktown Heights, N.Y., assignor to Paispearl Products, Inc., Hastings-on-Hudson, N.Y.
No Drawing. Filed May 20, 1970, Ser. No. 39,151
Int. Cl. B44d 5/06
U.S. Cl. 117—54         7 Claims

ABSTRACT OF THE DISCLOSURE

Mica is more uniformly coated, especially with bismuth oxychloride, to form a composite platelet of increased refractive index, by precipitating the coating out of aqueous medium onto undried mica which has been freshly wet ground in deionized water to reduce the particle size of the mica at least 5%.

---

The present invention is directed to the coating of mica flakes with bismuth oxychloride in order to provide a composite platelet crystal of increased refractive index, the mica platelet assuming the refractive index of the bismuth oxychloride which coats the same.

Efforts have been made to coat mica platelets with titanium oxide or zirconium oxide, but the products produced in this way are highly reflective whereas it is desired to provide a softer and more pearl-like appearance. Efforts have also been made to deposit bismuth oxychloride on mica, but the coatings which have been made available have not been satisfactory since the mica has not been smoothly coated and a significant proportion of bismuth oxychloride crystals are formed apart from the mica platelets resulting in a scratchy feel for the composite. In the invention, the bismuth oxychloride is forced to more uniformly coat the mica platelets and the formation of separate bismuth oxychloride crystals is greatly reduced such that the scratchiness previously encountered is largely eliminated, coverage is increased, and the product takes on an increased lustre.

With respect to the scratchiness noted above, it is believed that the scratchy feel which is so objectionable in cosmetic utility results from the inadequate surface coverage of the mica. This is because this scratchiness persists in the prior art even when bismuth oxychloride is used for the coating, and the bismuth oxychloride itself has a very soft feel and does not induce the objectionable scratchiness.

In accordance with the present invention, mica is wet ground to fracture the mica platelets and reduce the particle size as noted hereinafter and thereby provide surface portions which are highly active for a limited period of time when maintained in contact with water. It has been found that these active surface portions possess an unusual affinity for the precipitating bismuth oxychloride so that the bismuth oxychloride as formed is forced to coat the mica platelets and if effectively prevented from precipitating in the aqueous medium apart from the mica platelets which it is desired to coat.

It is desired to stress that freshly wet ground mica flakes must be used. If the mica flakes are permitted to dry and are then redispersed in water prior to deposit of the bismuth oxychloride, then the mica is not uniformly coated, separate bismuth oxychloride crystals are formed, and a scratchy feel is imparted to the pigment which is produced. If the wet ground mica is permitted to stand, then its capacity to attract the bismuth oxychloride deteriorates with time, even when the mica is not dried. The fresh wet ground undried mica produced in this invention retains some limited increased capacity to accept bismuth oxychloride for a period of up to about two weeks, but the wet ground undried mica flakes are preferably coated within one week and are most preferably coated within 36 hours.

The conditions of wet grinding are also significant in the invention. The purpose is to fracture the mica material in a manner which forces the exposure of surface portions which, for a limited period of time, have an unusual affinity for the precipitating bismuth oxychloride. It has been found that the exposure of such surface portions is enhanced when the wet grinding operation is carried out at a temperature of at least about 40° C. Preferably, higher temperatures of about 50° C. are employed. In the preferred wet grinding procedure, a suspension of mica in deionized water is agitated at high speed so as to shear the slurry and reduce the particle size of the mica. The shearing action causes a temperature rise to the temperature noted hereinbefore. It will be appreciated that an extremely vigorous agitation is contemplated since, otherwise, the desired temperature increase and desired reduction in particle size are not obtained.

It is stressed that the water must be deionized water or distilled water. Ordinary water contains considerable ionic content, usually calcium ion, and it has been found that the active surfaces generated herein tend to capture the calcium ions in ordinary water, thereby degrading their capacity to accept bismuth oxychloride as desired in the invention.

The wet grinding operation in this invention must be carried out to a considerable extent in order to produce a significant benefit. To this end, an at least about 5% reduction in particle size should be obtained by the wet grinding, as a minimum. The particle size which is measured herein is the largest planar measurement of the particle and the reduction of particle size which is intended is a reduction in the size of the particles by number average. It is preferred to reduce the particle size at least 10%, more preferably at least about 25% in order to provide an improvement which will best meet preferred commercial standards.

It is possible to identify the peculiar active surface needed in this invention by the capacity of the surface to adsorb Methylene Blue dye. Thus, if we take 2 cc. of a paste containing an equiweight mixture of mica and deionized water (which is the mixture normally subjected to wet grinding) and mix this with 5 cc. of a 0.1% aqueous solution of Methylene Blue dye, a portion of the dye is picked up by the mica. After washing with water until no further dye is extracted, and then spreading the solids so-obtained with a spatula over a filter paper, one can observe that the unmodified mica exhibits a light blue color which is slightly lighter than the color of the sky at sea level on a clear day. In contrast, when the mica has been modified to include a surface attractive to bismuth oxychloride then, when the same experiment is performed, using the mica which has been rendered receptive to precipitating bismuth oxychloride, the solids spread across the filter paper are dark blue, the depth of shade being proportional to the amount of active surface which has been exposed by the wet grinding operation. The difference between the light blue and the dark blue is so marked that there can be no mistaking the two. So long as the color which is exhibited in the manner described is significantly darker than the color of the sky at sea level on a clear day, then the mica platelets in that condition will pick up precipitating bismuth oxychloride significantly better than unmodified mica.

The amount of bismuth oxychloride which is deposited on the mica platelets can vary considerably. At the lower limit, all that is needed is enough bismuth oxychloride to increase the refractive index of the composite. At the upper extreme the main limitation is economic consideration since the mica is less expensive than the bismuth oxychloride creating an economic limitation from the standpoint that one uses as little bismuth oxychloride as is consistent with the improvement in refractive index desired. Normally, the bismuth oxychloride should constitute from 30–60% by weight of the composite pigment. At the upper extreme, it should be appreciated that it is preferred that the bismuth oxychloride content not exceed about 50% of the weight of the composite. Above about 50%, there is a tendency, which increases with increasing deposit, to form free bismuth oxychloride crystals. This is economically wasteful since such crystals do not improve the overall appearance and are inordinately expensive in comparison with the cost of the mica.

The production of bismuth oxychloride in appropriate condition to precipitate on the mica platelets is well known. Thus, bismuth chloride is hydrolyzed by the addition of water in acid solution containing the same and, as the water is added and time passes, bsimuth oxychloride is formed and precipitates. It is preferred in this invention to produce the bismuth chloride in situ by reaction of bismuth nitrate and hydrochloric acid in the deionized aqueous medium since this enables the production of a heavier layer of bismuth oxychloride than can be produced in other manners. However, the use of bismuth nitrate and hydrochloric acid is not an essential of the invention.

The specific nature of the mica which is employed is of secondary consideration, but it is preferred to employ wet ground muscovite which is available in commerce in the form of a dry powder.

The invention has been described in its most preferred form in which bismuth oxychloride is precipitated on the freshly wet ground mica platelets in order to produce the desired high refractive index coating thereon. However, other high refractive index coatings can also be deposited. Thus, if bismuth nitrate is hydrolyzed in nitric acid medium, bismuth oxynitrate or subnitrate is formed and will precipitate on the mica. Similarly, bismuth subcarbonate can be formed (by reacting bismuth acetate with an aqueous solution of sodium carbonate) and caused to precipitate on the mica. While the oxychloride provides the best lustre, the other agents are also beneficial in increasing the refractive index of the mica and the preparation of the mica as taught herein encourages uniform coating of the mica platelets. Accordingly, in the broadest aspect of the invention, the specific agent which precipitates in the aqueous medium to coat the mica platelets and increase its refractive index is of secondary consideration.

The invention is illustrated in the following example.

EXAMPLE 32 lbs. of wet ground mica, 325 mesh, are combined with an equal amount of deionized water and placed into disc type, high shear mixing equipment. It is ground for a period of time until the temperature rises to about 50° C., due to the high shear (about 20 minutes). By that time, the particle size is reduced by about one third. This material is now placed in a 600 gallon reactor and combined with 500 liters deionized water, 47 lbs. of bismuth nitrate and 60 liters hydrochloric acid of 32.5%. After all the ingredients are homogenized and the bismuth nitrate is dissolved, 1800 liters of deionized water at 50° C. are added at a flow rate of approximately 100 gallons per minute under agitation. The reaction is a hydrolysis as follows:

$$Bi(NO_3)_3 + HCl + H_2O \rightarrow BiOCl + 3HNO_3$$

It is believed that $BiCl_3$ is formed as an intermediate during the reaction.

The mica does not participate in this procedure but in the early stages of the hydrolysis the coating of the platelet begins and builds up until the total reaction is completed. After completion of the reaction, the solids are separated, washed and dried, thereby obtaining about 50 pounds of a white, free-flowing, dry, pearl pigment of extremely good lustre and smoothness.

The invention is defined in the claims which follow.

I claim:

1. In a method for the precipitation of coatings of high refractive index out of aqueous medium onto the surface of mica platelets suspended in said aqueous medium, the improvement which comprises precipitating the coating onto undried mica platelets which have been wet ground in deionized water to effect an at least about 5% reduction in particle size within up to about two weeks prior to use.

2. The improvement recited in claim 1 in which the mica platelets are wet ground to reduce their particle size at least 10% and are coated within one week.

3. The improvement recited in claim 1 in which the mica platelets are wet ground to reduce their particle size at least 25% and are coated within 36 hours.

4. The improvement recited in claim 1 in which the mica is wet ground by agitating a suspension thereof in deionized water until a temperature of at least about 40° C. is reached.

5. The improvement recited in claim 1 in which the mica which is coated is strongly adsorptive of Methylene Blue dye as evidenced by the production of a blue coloration darker than the color of the sky at sea level on a clear day when the solids obtained by mixing 2 cc. of an equiweight mixture of mica and deionized water with 5 cc. of a 0.1% aqueous solution of said dye are separated, washed free of dye with water and spread with a spatula over filter paper.

6. The improvement recited in claim 1 in which the precipitated coating is a derivative of bismuth precipitated from acidic aqueous medium.

7. The improvement recited in claim 6 in which bismuth oxychloride is precipitated by the presence of hydrochloric acid in a bismuth chloride-containing acidic aqueous medium.

References Cited

UNITED STATES PATENTS

| | | | |
|---|---|---|---|
| 2,974,053 | 3/1961 | Suchow | 106—291 X |
| 3,087,829 | 4/1963 | Linton | 106—291 X |
| 3,274,013 | 9/1966 | Batt | 106—291 X |
| 3,087,827 | 4/1963 | Klenke et al. | 106—291 |
| 3,123,485 | 3/1964 | Miller et al. | 106—291 X |
| 3,342,617 | 9/1967 | Jackson | 106—291 |
| 3,453,131 | 7/1969 | Fadner | 106—308 B |
| 3,597,250 | 8/1971 | Rands et al. | 106—291 |
| 3,422,185 | 1/1969 | Kuritzkes | 106—291 X |

WILLIAM D. MARTIN, Primary Examiner

S. L. CHILDS, Assistant Examiner

U.S. Cl. X.R.

106—291; 117—100 S, 123 B